Figure 1:
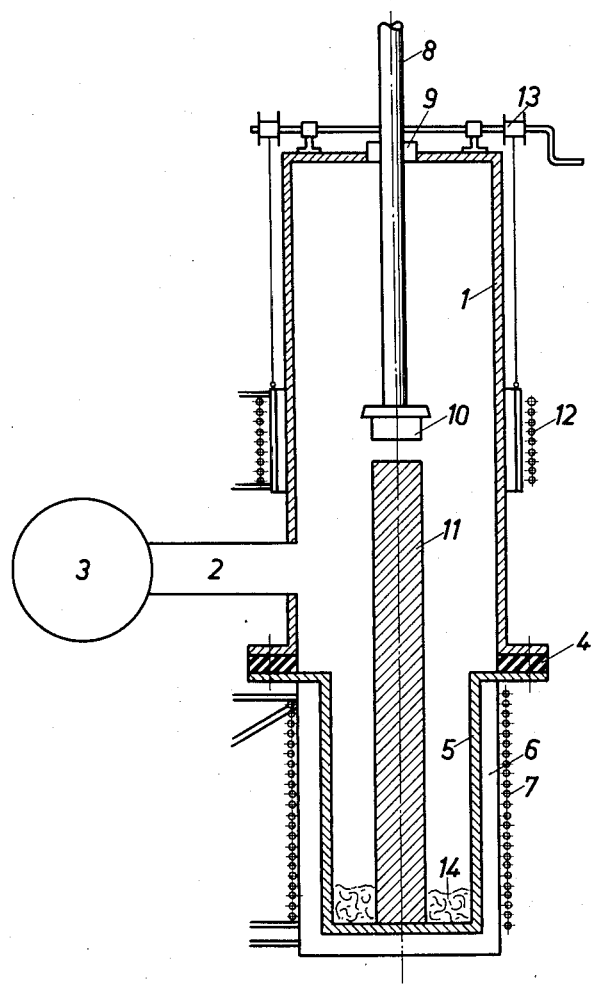

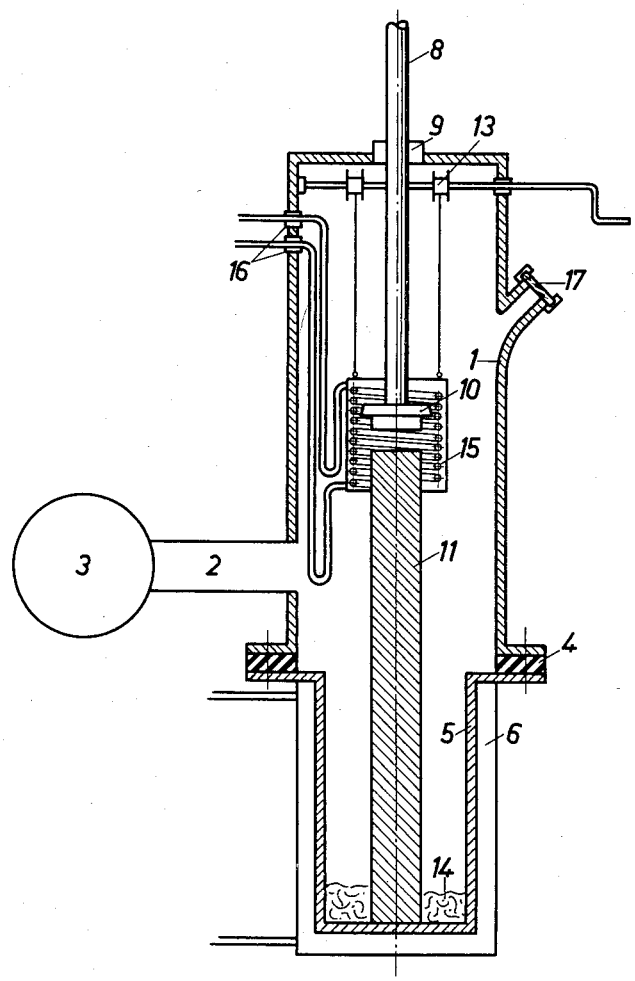

2,971,996
Patented Feb. 14, 1961

2,971,996

VACUUM ARC FURNACE WITH CONSUMABLE ELECTRODE

Helmut Gruber and Helmut Scheidig, Hanau (Main), Germany, assignors to W. C. Heraeus G.m.b.H., Hanau (Main), Germany, a firm Filed May 14, 1959, Ser. No. 813,181

Claims priority, application Germany May 31, 1958

7 Claims. (Cl. 13—31)

The present invention relates to improvements in vacuum arc furnaces operating with consumable electrodes, and more particularly to improved means for connecting an electrode supporting rod to a consumable electrode within an arc furnace.

In many vacuum arc furnaces operating with consumable electrodes, the latter are secured to supporting rods which are insertable from the outside into the vacuum chamber or always extend into the same and are hermetically sealed therein. The use of such a separate supporting rod has the advantage that it has a definite and uniform cross-sectional size along its entire length and thus permits the sealing means through which the supporting rod passes into the vacuum chamber to effect a proper sealing action.

Prior to this invention, there have been various means disclosed for securing the supporting rod to the electrode. However, most of these means were so complicated or accompanied by so many technical difficulties that they were of very little practical use. The particular difficulties which these securing means have to contend with derive from the fact that the electrode must be removable therefrom to permit a consumed electrode to be exchanged for a new electrode, that they must be able to carry the considerable weight of the electrode, and that they must also permit electric currents of a high intensity to be transmitted to the electrode. At first, these securing means were made in the form of purely mechanical clamping devices. However, due to the fact that the upper ends of the electrodes are never of an identical size and shape, such mechanical clamping devices are never reliable and offer fail to function entirely. For this reason they have largely been abandoned and the connection between the supporting rod and the electrode was produced by first securing a short stub of a solid material, preferably the same metal of which the electrode consists, to the supporting rod by means of clamps and thereafter welding the electrode thereon. In order to attain a secure weld between the short stub on the supporting rod and the electrode itself and to prevent any oxidation of the electrode material, it is absolutely necessary to carry out such welding operation within a vacuum.

This is usually carried out by first placing the electrode in an upright position into the melting crucible and temporarily securing it therein in such positon, then lowering the supporting rod with the stub thereon within the vacuum chamber until the stub connects or almost connects with the upper end of the electrode, and by then switching on the welding current to flow between the supporting rod and the crucible. Although this method has in many cases proved to be relatively successful, it has the great disadvantage that the electrode is usually welded to the stub on the supporting rod only along the edges and that such a weld is not always reliable, particularly if the electrode is very heavy.

It is an object of the present invention to overcome the above-mentioned disadvantage and to do this in a surprisingly simple manner. It consists in also providing a field coil of the stationary type, as generally known for concentrating electric arcs, at the upper part of the furnace and in mounting such a coil so as to be adjustable in elevation to permit the coil to surround the place of connection between the stub on the supporting rod and the upper end of the electrode during the welding operation, and to concentrate the welding arc by means of such a field coil.

These and other objects, features and advantages of the present invention will be further apparent from the following detailed description thereof, particularly when read with reference to the accompanying drawings, in which—

Figure 1 shows a diagrammatic longitudinal section of the vacuum arc furnace according to the invention; while Figure 2 shows a similar view of a modification thereof.

The vacuum arc furnace as illustrated in Figure 1 is generally designed in the usual manner and consists of a furnace part 1 which is connected by a pipe 2 to a pump unit 3 for evacuating the furnace and measuring the vacuum therein. The crucible 5 is removably secured to the upper part 1 of the furnace but so as to be insulated therefrom by an insulation 4. The crucible 5 is provided with a water-cooling chamber 6, and with a field coil 7 which is wound in the conventional manner around the water-cooling jacket and provided with a direct current for concentrating the arc while the melting process is carried out. The electrode supporting rod extends from the outside through a vacuum seal 9 into the upper part 1 of the furnace. On its lower end, the supporting rod 9 carries a stub 10 which preferably consists of the same material as the consumable electrode 11 which is to be welded thereon. The current for operating the furnace and melting off the consumable electrode therein is connected to the crucible 5 and to the supporting rod 8.

According to the invention, the upper part 1 of the furnace is surrounded by another field coil 12 which may be adjusted in elevation by a simple elevating device 13.

The entire apparatus operates as follows:

Before the crucible 5 is attached and secured to the upper furnace part 1, the electrode 11 is inserted into the crucible 5 and held therein in a fixed upright position by a packing 14 of metal chips. Of course, in place of such a packing 14, other suitable means may be provided to hold the electrode temporarily in a fixed upright position until it is welded to the supporting rod 8.

The crucible 5 with the electrode 11 therein is then attached from below to the upper furnace part 1 to which it is firmly secured. The insulating layer 4 between the upper end of crucible 5 and the lower end of furnace part 1 insulates these two parts of the furnace electrically from each other. Thereupon the electrode supporting rod 8 is moved downwardly until the stub 10 thereon just touches the electrode 11 at a few points. Field coil 12 is then adjusted by the elevating device 13 to a level in which it surrounds the point of contact between the lower edge of stub 10 and the upper end of electrode 11. Coil 12 is then supplied with a direct current, whereupon the welding current is switched on to flow between the crucible 5 and the supporting rod 8.

The advantage attained according to the invention by the provision of the adjustable field coil 12 resides in the fact that the electrode will no longer be welded to the stub 10 merely at the edges, but that considerable areas of the contacting surfaces will be welded together so that the electrode will be much more securely combined with the stub 10 and supporting rod 8 and the weld will be capable of carrying even the heaviest electrode without danger of separating therefrom.

When applying the embodiment of the invention as illustrated in Figure 1, in which the field coil 12 surrounds the upper furnace part 1, it has been found advisable to make this part 1 of a non-ferromagnetic material, preferably stainless steel.

The modification of the invention as illustrated in Figure 2 differs from the above-described embodiment by the fact that the field coil does not surround the outside of the upper furnace part but is arranged at the inside thereof. In this event, the adjustable field coil 15 has a smaller cross-sectional size, and as it is also not screened from the arc by the outer wall of furnace part 1, the currents which are required for producing a field intensity of the same strength as in the first embodiment according to Figure 1 may be considerably smaller than those required in the first embodiment. The leads of field coil 15 are sealed hermetically at 16 into the wall of furnace part 1. It has also been found advisable to provide an inspection window 17 through which the position of field coil 15 relative to the weld to be formed between stub 10 and electrode 11 may be examined. Since field coil 15 is directly exposed to the radiation of the welding arc, it has also been found very advisable to provide a water-cooling system for this coil. The water may then be supplied to and returned from coil 15, for example, through flexible tubes surrounding the insulated current leads of coil 15 which are then passed hermetically at 16 through the wall of furnace part 1. Such water-cooling system has the further advantage that the heat produced by the current will be easily eliminated so that the copper winding of the coil may be made of a smaller cross-sectional size than normally required by the maximum current supplied thereto.

After the stub on supporting rod 8 has been welded to the electrode 11, field coil 15 is drawn upwardly by the elevating device 13 so as not to interfere in the melting process, whereupon the supporting rod 8 with the consumable electrode 11 welded thereon may be drawn upwardly and the actual melting operation may be started. At the beginning of this operation, the metal chips 14 previously used as a packing to hold the electrode in a fixed upright position will be melted, whereupon the crucible 5 will be gradually filled with the metal which is melting off the electrode.

An apparatus designed according to the present invention has been tested extensively in actual operation and proved very successful since the respective electrode 11 was always securely connected to the stub 10 and thus also to the supporting rod 8 along its entire cross-sectional area so that no difficulties arose either through the heavy weight of the electrode 11 or through the relatively high currents supplied for maintaining the melting arc. Because of such secure and all-over perfect connection between the electrode and the supporting rod 8, these currents were conducted through the weld without any noticeable resistance.

Although our invention has been illustrated and described with reference to the preferred embodiments thereof, we wish to have it understood that it is in no way limited to the details of such embodiments, but is capable of numerous modifications within the scope of the appended claims.

Having thus fully described our invention, what we claim is:

1. A vacuum arc furnace comprising an upper furnace part, a crucible, insulating means intermediate said upper part and said crucible, means for removably securing said crucible to said upper part, means for evacuating said furnace, a consumable electrode first arranged to be held in a fixed upright position in said crucible, an electrode supporting rod passing from the outside into said furnace through the upper end thereof, means for sliding said supporting rod in a substantially vertical direction within said furnace and into engagement with the upper end of said electrode and for raising and lowering said supporting rod with said electrode thereon after being welded to each other, a field coil at said upper furnace part, means for adjusting said field coil in a substantially vertical direction for placing the same substantially at the level of and surrounding the upper end of said electrode, means for supplying a current to said crucible and said supporting rod, and means for supplying a direct current to said field coil to concentrate a welding arc between the lower end of said supporting rod and the upper end of said electrode for welding said ends to each other.

2. A vacuum arc furnace as defined in claim 1, wherein said field coil is disposed around the outside of said upper furnace part and is adjustable in the vertical direction thereof.

3. A vacuum arc furnace as defined in claim 1, wherein said field coil is disposed at the inside of said upper furnace part and is adjustable in the vertical direction so as to be placed substantially at the level of and surrounding the engaging ends of said supporting rod and said electrode.

4. A vacuum arc furnace as defined in claim 1, wherein the lower end of said supporting rod comprises a short stub consisting of a material similar to the material of said consumable electrode.

5. A vacuum arc furnace as defined in claim 1, wherein the wall of said upper furnace part substantially consists of noncorrosive steel.

6. A vacuum arc furnace as defined in claim 1, further comprising means for water-cooling said field coil.

7. A vacuum arc furnace as defined in claim 1, further comprising means for holding said electrode in said fixed upright position within said crucible before the ends of said electrode and said supporting rod are welded together, said holding means comprising a packing of metal chips in said crucible and arranged to be melted after said electrode and supporting rod have been welded together and until both together have been raised from the bottom of said crucible at the beginning of the operation of melting said electrode.

References Cited in the file of this patent

UNITED STATES PATENTS

| | | |
|---|---|---|
| 676,576 | Cowles | June 18, 1901 |
| 1,671,461 | Bagley | May 29, 1928 |
| 1,963,869 | Sandelowsky et al. | June 19, 1934 |
| 2,065,023 | Rao | Dec. 22, 1936 |
| 2,286,210 | Klemperer et al. | June 16, 1942 |
| 2,726,278 | Southern | Dec. 6, 1955 |
| 2,857,445 | Mangin | Oct. 21, 1958 |
| 2,902,573 | Guyer | Sept. 1, 1959 |
| 2,916,536 | Gruber et al. | Dec. 8, 1959 |